Sept. 20, 1949.　　　　　　C. J. WERNER　　　　　　2,482,568
ACTUATOR CONTROL
Filed May 26, 1945　　　　　　　　　　　　　　2 Sheets-Sheet 1
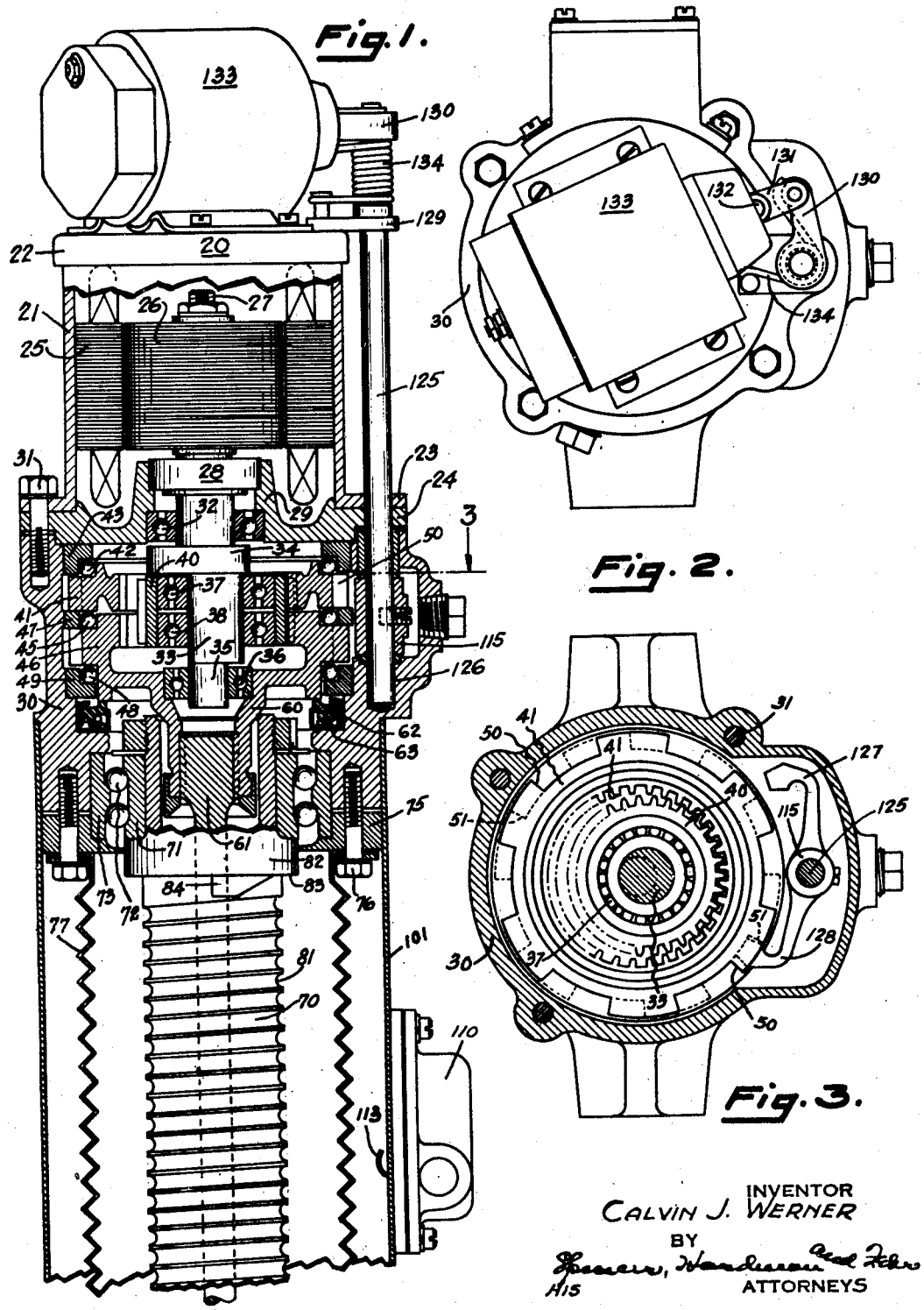
INVENTOR
CALVIN J. WERNER
BY
ATTORNEYS Sept. 20, 1949.  C. J. WERNER  2,482,568
ACTUATOR CONTROL
Filed May 26, 1945  2 Sheets-Sheet 2

INVENTOR
CALVIN J. WERNER
BY
Spencer, Hardman & Fehr
HIS  ATTORNEYS

Patented Sept. 20, 1949

2,482,568

UNITED STATES PATENT OFFICE 2,482,568

ACTUATOR CONTROL

Calvin J. Werner, Dayton, Ohio, assignor to General Motors Corporation, Detroit, Mich., a corporation of Delaware Application May 26, 1945, Serial No. 595,961

8 Claims. (Cl. 74—785)

1

This invention relates to improvements in motor driven actuators adapted to raise or lower a load.

It is among the objects of the present invention to provide a motor driven actuator which is locked against movement to permit shifting of the load while the motor is inoperative, but which is unlocked and rendered operative to shift the load when the motor is energized.

A further object of the present invention is to provide a motor driven load raising and lowering actuator having automatic control members operative to stop the motor and lock the actuator against movement when the load reaches one or the other of two predetermined positions.

A still further object of the present invention is to provide a shock absorbing connection between the driving motor and the load raising and lowering member of the actuator for bringing the actuator to a cushioned stop in case of failure of the automatic control means intended to stop the motor operation at predetermined load position.

Further objects and advantages of the present invention will be apparent from the following description, reference being had to the accompanying drawings, wherein a preferred embodiment of the invention is clearly shown.

In the drawings:

Fig. 1 is a fragmentary, part sectional view of the upper portion of the actuator.

Fig. 2 is a plan view of the actuator shown in Fig. 1.

Fig. 3 is a part transverse sectional view of the actuator taken in the plane 3 of the Fig. 1.

Figure 4:
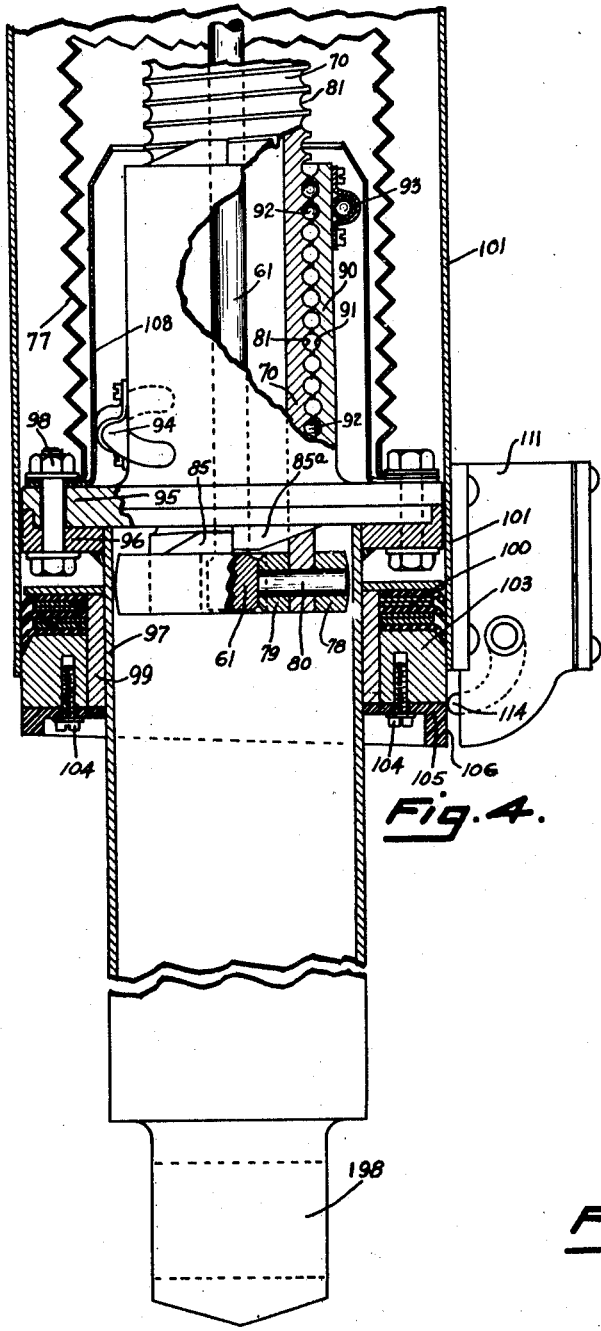
Fig. 4 is a fragmentary, part sectional view of the lower portion of the actuator.

Referring to the drawings, the actuator comprises an electric motor 20 having a motor housing 21. One end of this motor housing 21 is closed by a cap 22, the other end has an outwardly extending flange 23 resting in an annular recess provided in the upper surface of the plate 24.

The electric motor has stator windings 25 and an armature or rotor 26. This rotor has a shaft 27 journalled in a bearing 28 which is supported in a central recess of the hub 29 formed on a plate 24 interposed between the motor housing 21 and the main housing 30. The motor housing

2

21, plate 24 and the main housing 30 are secured together by a series of bolts or screw studs 31.

Another ball bearing 32 carried in the central recess of the plate 24 supports the rotor shaft 27. This rotor shaft 27 has a portion 33 eccentric to the shaft portion journalled in the ball bearing 32. Between the portion of the shaft journalled in bearing 32 and the eccentric portion 33 the shaft has a portion 34 so arranged as to counter balance the eccentric portion 33 thereof. The end portion 35 of the shaft coaxial with the portion of the shaft journalled in the bearing 32 is journalled in the ball bearing 36.

Two ball bearings 37 and 38 are supported by the eccentric portion 33 of the rotor shaft, these two ball bearings in turn supporting the epicyclic gear 40. This epicyclic gear has teeth operatively engaging with the teeth of two ring gears. One of these ring gears designated by the numeral 41 is supported by ball bearings 42 interposed between the upper surface of said ring gear and a bearing race 43 supported in the housing 30 adjacent the intermediate plate 24. Another ball bearing 45 engages the bottom surface of the ring gear 41, being interposed between said ring gear 41 and the ring gear 46. A race 47 in the form of a ring is secured in the housing 30 and is engaged by the balls of the ball bearing 45. A ball bearing 48 engages a surface of the ring gear 46 and rests in the race 49 carried in the housing 30. Thus the ring gears 41 and 46 are rotatably supported between ball bearings 42 and 48 adjacent their outside surfaces and an intermediate ball bearing 45 which is interposed between the two ring gears. The epicyclic gear 40 as shown in Fig. 1 is of substantially smaller diameter than the pitch diameter of the ring gears 41 and 46, the teeth of the epicyclic gear 40 meshing with the interior gear teeth of both said ring gears. The ring gear 41 has a series of equally spaced notches 50 provided in its outer annular surface and similar notches 51 are provided in the outer annular surfaces of the ring gear 46.

The ring gear 46 has a depending sleeve 60, the inner portion of which is splined to receive the similarly splined end of the torsion bar 61. A packing gland 62 of any suitable design is interposed between the ring gear 46 and a shoulder 63 in the housing 30.

The actuator has a tubular screw shaft 70, the upper end of which telescopically receives a portion of the depending sleeve 60 of the ring gear 46 as shown in Fig. 1, no connection, however, being provided between the screw shaft and this ring gear at this point. A sleeve 71 fits about the outer upper end of the screw shaft 70 and forms the inner race for a double ball bearing 72, the outer race 73 thereof being supported in a central recess at the lower end of housing 30 and by a clamping collar 75 secured to the housing 30 by screw studs 76. Thus this upper end of the screw shaft is rotatably supported in the lower end of the housing 30. The screw studs 76 also act to attach a sealing bellows 77 at one side of the clamping plate or ring 75, said sealing bellows surrounding the screw shaft 70 and being capable of expansion and collapse. As shown in Fig. 4, the lower end of the screw shaft 70 has an outer ring 78 attached thereto and an inner ring 79, both being attached to the screw shaft 70 by cross pins 80. The inner ring 79 has a central recess provided with splines which receive corresponding splines on the lower end of the torsion bar or rod 61. Thus it may be seen that the torsion bar has its upper end splined to the ring gear 46 so as to rotate therewith while its lower end is splined to the inner ring 79 which is attached to the screw shaft 70 so that rotation of the ring gear 46 causes rotation of the torsion bar 61 and it in turn will cause rotation of the screw shaft 70 through the inner collar 79 secured thereto. The screw shaft 70 has the helical groove 81 cut in its outer annular surface, said groove being substantially semi-circular in cross section and extending from substantially adjacent the clamping ring 75 through which the screw shaft extends to the rings or collars 78 and 79 attached at the lower end of the screw shaft. At the upper end of the screw shaft a head portion 82 is provided thereon, which head portion has the inner race 71 of the ball bearing 72 secured thereto. A shoulder 83 is provided between the head portion 82 and the smaller diameter grooved portion of the screw shaft and on this shoulder 83 is formed an abutment lug 84. A similar abutment lug 85 is provided on the ring 78 secured to the lowermost end of the screw shaft 70 by pins 80.

The screw shaft 70 which may be termed the rotatable member of the actuator has a nut 90 mounted thereon, the interior annular surface of said nut, which slidably fits about the screw shaft, being provided with an intermediate helical slot 91 corresponding in size and pitch to the helical slot 81 cut in the outer annular wall of the screw shaft. When the nut is in position on the screw shaft a helical channel is formed between the nut and screw shaft as shown in Fig. 4, this channel being substantially circular in cross section. In order mechanically to connect the nut with the screw shaft, ball bearings 92 are provided in this helical passage between the nut and screw shaft. Preferably two groups of ball bearings are provided, one group filling substantially one and a half convolutions of the helical groove, the other group filling another and different one and a half convolutions of said helical passage. The nut has apertures in its annular wall communicating with the annular passages containing the group of ball bearings. A by-pass tube 93 is secured to the outer surface of the nut and is in communication at two points with the ducts containing the one group of ball bearings 92 so that as the screw shaft rotates relatively to the nut the ball bearings will continuously travel through the one and a half or so convolutions of the helical passage and thence through the by-pass tube 93 in communication with said helical passages. The same is true of the by-pass tube 94 at a different position on the nut which by-passes the group of ball bearings filling the second one and a half or so helical passages at this point in the assembly. This type of mechanical connection between a grooved nut and screw shaft is clearly illustrated and described in Patent No. 2,383,901, issued August 28, 1945.

The nut 90 as shown in Fig. 4 has an outwardly extending annular flange 95 to which is secured the flange 96 formed integral with or welded to a tubular member 97. Bolts 98 secure this tube 97 and its flange 96 to the flange 95 of the nut 90 so that as the nut moves longitudinally of the screw shaft, so will also the tube 97 move longitudinally thereof. This tube as shown in Fig. 4 surrounds the collar 78 which is secured to the lower end of the screw shaft. At the lowermost end of tube 97 is secured the trunnion 198 to which the load to be shifted by the actuator is adapted to be attached. This tube 97 carries a collar 99 to which the wiping assembly 100 is secured, said wiping assembly frictionally engaging the inner surface of a tube 101, the opposite or upper end of which is anchored to the housing 30 in any suitable manner. A clamping ring 103, secured to the collar 99, holds the wiping assembly 100 in proper position and also provides a support for receiving the screws 104 which hold the adjustable plate 105 on said collar. This plate 105 as shown in Fig. 4 has an annular flange of constantly varying width, providing a variable surface 106 for purposes to be described. The screw studs 98 which secure the flange 96 of tube 97 to the nut also secure the lower end of the expansible and collapsible bellows seal 77 to the nut and also secure the cylindrical shield 108 to the nut, which cylindrical shield surrounds the nut and acts as a support for the collapsible bellows within the region of the nut.

Two limit or control switches are secured to the stationary tube 101, the one limit switch 110 is positioned adjacent the housing 30 to which tube 101 is secured, the other limit switch 111 being secured to the lower end of the tube 101. The switch 110 has an actuating lever 113 extending through an opening in the tube 101 and into the path of movement of the flange 95 of the nut which is of slightly lesser diameter than the inside diameter of the tube 101. When the actuator lever 113 of switch 110 is in normal position, that is, when it is not engaged by the flange 95 of the nut, the switch is in circuit closing position. Switch 111 has an actuating lever 114 engageable by the ring 105 secured to the tube 97 which in turn is secured to the nut 90 so as to move therewith. When the lever 114 is engaged by said ring 105 the switch is actuated to break its circuit, however, when the lever 114 of switch 111 is released, the switch automatically closes its circuit. In order to vary the time of contact between the ring 105 and the switch lever 114 so as to vary the time of switch actuation, this ring 105 may be rotated so that if an earlier opening of the switch is required as the nut moves downwardly, a broader portion of the annular surface of ring 105 is presented, and if it is decided to retard the action of said switch lever, the ring 105 is adjusted to present a narrower surface whereby the switch lever will be actuated at a later time in the movement of the nut downwardly.

It has been stated that one object of the present invention is to lock the actuator against rotation when the electric motor is not energized and to render the actuator operative to raise or lower the load when the motor is energized for operation.

Referring particularly to Figs. 1, 2 and 3, a shaft 125 extends into and through openings in the flange of motor housing 21, the intermediate plate 24 and into a recess 126 in the housing 30. Attached to this shaft is a ratchet 115 consisting of a hub and oppositely disposed arms 127 and 128. The shaft 125 extends through a supporting plate 129 secured to the cap 22 and has a lever 130 secured to its upper end. This lever 130 is hingedly connected with a link 131 which in turn is connected to the reciprocative armature 132 of a solenoid magnet 133. A spring 134 engages the lever 130 and normally, yieldably urges said lever clockwise as regards Fig. 2. In urging the lever 130 and shaft 125 clockwise, the armature 132 of the solenoid magnet 133 is normally maintained in unattracted position and the rod 125 is actuated so that the ratchet arm 128 is in nesting engagement with one of the slots 51 in the ring gear 46. Thus it may be seen that normally the locking ratchet arm 128, in engaging the ring gear 46, locks said ring gear against any rotation thereby preventing rotation of the torsion bar 61 and consequently the screw shaft 70 to which said torsion bar is secured through collar 79. When the ratchet 128 is in this normal locking position the effect of the weight on the nut, regardless of its position, and tendency to turn the screw shaft will be avoided, for under these circumstances the screw shaft cannot rotate. If, however, the solenoid electromagnet 133 is energized so that its reciprocative armature is drawn inwardly, the link 131 connected between the reciprocative armature and the lever 130 will operate said lever counterclockwise as regards Fig. 2, thereby rotating the shaft 125 counterclockwise, resulting in the withdrawal of the arm 128 of the ratchet from engagement with the notch 51 of the ring gear 46 and the insertion of the arm 127 into one of the notches 50 of the ring gear 41 thereby releasing the ring gear 46 and locking the ring gear 41 against rotation. In order that the motor may rotate the screw shaft 70 through the reduction gearing including the two ring gears 41 and 46 and the cooperating epicyclic gear 40, it is necessary to lock the ring gear 41 against rotation and thus when the ratchet arm 127 engages a notch 50 of the ring gear 41, the motor is adapted to drive the screw shaft 70.

The present actuator may be used to operate doors, wing flaps, louvres or landing gears of airplanes. The Fig. 5 is a diagrammatic view of an installation showing all of the electrical units of the system and their electrical connections.

Figure 5:
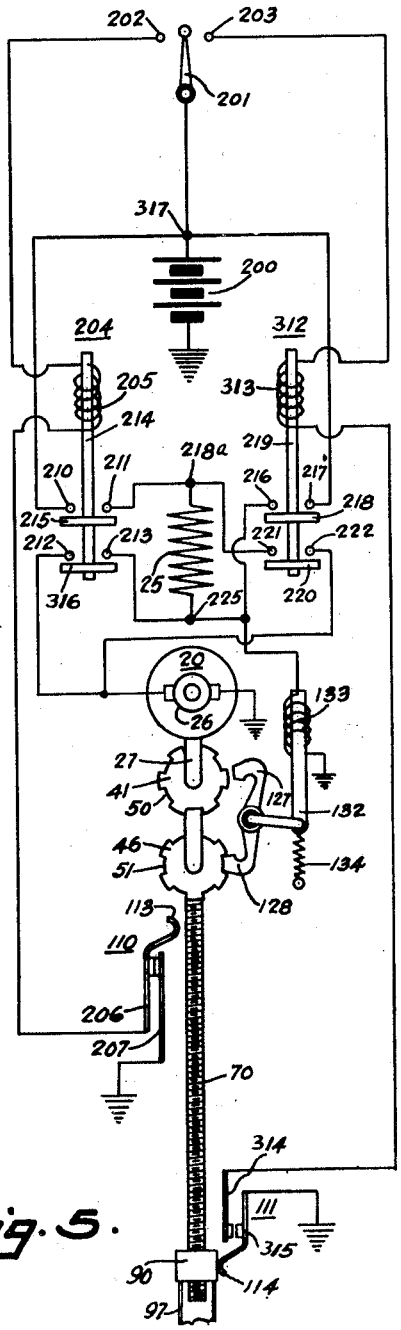
Fig. 5 is a diagrammatic view showing the various electrical elements of the actuator and their electrical connections with other electrical elements of the complete installation of the device.

Referring to the Fig. 5, the source of electric power is shown in the form of a storage battery 200, one side of which is grounded, the other side being connected to the movable contact arm 201 of the selector switch which has stationary contacts 202 and 203. The movable contact arm 201 may be moved from normal "off" position as shown, into engagement with the stationary contact 202 when the actuator is to be operated in one direction, and into engagement with the stationary contact 203 when the actuator is to be operated in the opposite direction. An electromagnetic contactor 204 has a magnet winding 205, one end of which is connected to the stationary contact 202 of the selector switch, the other end being connected to the movable contact 206 of the limit switch 110. A stationary contact 207 is normally engaged by the movable contact 206, this stationary contact being grounded. The electromagnetic contactor 204 has two pairs of stationary terminals 210—211 and 212—213. An armature core 214 carries bridging elements 215 and 216, the former being adapted to bridge the stationary terminals 210—211, and the latter stationary terminals 212—213, when energization of the electromagnetic winding 205 attracts and moves the core 214. The stationary contact 210 of the contactor 204 is connected with the battery at the junction point 317 and its associate stationary contact 211 is connected with the field winding 25 of the motor at the junction point 218a. The other end of the field winding 25 is connected with the stationary terminal 213 of the contactor 204, the opposite terminal 212 being connected with one side of the circuit of armature 26, the other side of this armature circuit being grounded.

The other electromagnetic contactor 312 has an electromagnetic winding 313, one end of which is connected to the stationary contact 203 of the selector switch, the other end being connected with the stationary contact 314 of the limit switch 111, said stationary contact 314 cooperating with the movable contact 315 which is grounded. Contactor 312 has one set of contacts 216—217 adapted to be bridged by bridging element 218 carried by the magnet core 219, while another bridging element 220 on said core is adapted to bridge the stationary contacts 221 and 222 of said contactor. Stationary contact 217 of this contactor is connected with the battery 200 at junction point 317, the other stationary contact 216 is connected with the motor field winding 25 at junction point 225. Stationary contact 221 is connected with the opposite end of the field winding 25 at the junction point 218a and stationary contact 222 is connected with the armature circuit. The winding of the solenoid magnet 133 is connected with the field winding 25 at the side adjacent the junction point 225, the other side of this magnet winding being grounded.

The device as shown in Fig. 5 has the nut 90 at its outer extreme position on the screw shaft or particularly as shown in the Fig. 4 also. When the operator decides to operate the actuator so that the nut is moved to its inner extreme position or adjacent the head 82 of the screw shaft, he manipulates the selector switch 201 so that it engages the stationary contact 202. Now current from the storage winding flows through the winding 205, across contacts 206 and 207 of switch 110, energizing said winding to cause the contactor 204 to be actuated so that its stationary contacts are properly bridged. With the bridging of these stationary contacts, current from the battery will flow to contact 210 across bridge 215 to 211 thence to the junction point 218a in one direction through the field winding 25 of the motor to junction 225 and thence across contacts 213—212 and through the armature circuit to ground. This will cause the motor to rotate in a direction in which the nut 90 will move axially upwardly on the screw shaft 70. It will be understood that the nut 90 is non-rotatable inasmuch as the tube 97, secured thereto, has its trunnion portion 98 secured to the load or object which is to be moved. As the nut 90 moves upwardly on the screw shaft 70 in response to its rotation in this one direction, it will first disengage in this one direction, it will first disengage the contact operating arm 114 of the limit switch 111, permitting said limit switch to close. Closing of this limit switch has no effect whatsoever inasmuch as the contact 203 of the selector switch in circuit with this limit switch 111 is not engaged by the movable contact 201 of said selector switch. As the nut 90 moves upwardly it will eventually engage the contact operating arm 113 of the limit switch 110 and as it does, contacts 206—207 of this limit switch 110 are separated, thereby breaking the circuit through the magnet winding 205 of the contactor 204 causing its deenergization and a return of the contactor 204 to its circuit breaking position; thus as soon as its contacts 210—211 and 212—213 are disengaged by their respective bridging elements 215—216 the circuit through the electric motor is broken and consequently the motor is rendered inoperative.

Before the operator has manipulated the selector switch 201 into engagement with the stationary contact 202 and while the actuator was at rest, the ratchet arm 128 was in engagement with the ring gear 46 to lock it against rotation. Ring gear 46, as has previously been described, is operatively connected with the screw shaft 70 through the torsion bar 61 and consequently locking of the ring gear 46 against rotation likewise locks the screw shaft 70 against any rotation. As soon as the motor circuit is completed as just described, the circuit through the solenoid electromagnet winding 133 is also completed and therefore the solenoid magnet will actuate the ratchet to release the ring gear 46 and to engage and lock the ring gear 41 against rotation, for as the electromagnet core or armature 132 is attracted and the shaft 125 operated counterclockwise, the ratchet arm 128 disengages ring gear 46 and the ratchet arm 127 engages ring gear 41. Now the motor as it rotates will operate through the reduction gearing to rotate the screw shaft at a reduced rate. As soon as the limit switch 110 is opened by engagement of the nut 90 with the contact operating arm 113 of the switch 110, the motor circuit is broken as has been described and consequently the circuit through the solenoid magnet is also broken, deenergizing said solenoid magnet 133 and permitting its spring 134 to return the latch to normal position in which the arm 127 thereof will release the ring gear 41 and engage the ring gear 46 to lock said ring gear and its shaft 70 against rotation, thus holding the load supported by the nut 90 in this predetermined raised or operated position.

When it is desired to move the load from this raised position to its other predetermined position, which may be termed the lowered position, the operator moves the movable contact 201 of the selector switch into engagement with the stationary contact 203 of this switch at which time current from the battery will flow through the electromagnet winding 313 of the contactor 312 and across the now closed contacts 314—315 of the limit switch 111. The winding 313 of the contactor 312 being energized will attract the armature core 219 to move the bridging element 218—220 thereon into circuit closing position with their respective stationary contacts, thus closing the circuit from the battery across contacts 217—216 to the junction point 225, thence through the motor field winding 25, in a direction opposite to that aforedescribed, to junction point 218a, thence across contacts 221 and 222 to the one side of the armature circuit, the opposite side being grounded. At the same time a circuit through the solenoid magnet winding 133 causes its energization to actuate the latch for releasing the ring gear 46 and engaging the locking ring gear 41. Under these conditions the motor rotates in the opposite direction, rotating the screw shaft 70 so that the nut 90 thereon moves downwardly away from switch 110 toward the switch 111. As said nut 90 moves away from switch 110 its contact actuating arm 113 is released and permits contacts 206 and 207 of said switch again to close and when the nut 90 reaches the predetermined lowered position, it will engage the arm 114 of switch 111, opening said switch to break the circuit through the contactor 312, permitting its return to full circuit breaking position. Now the motor is stopped and the screw shaft 70 is locked against rotation.

In case the switches 110 and 111 or some other electric circuit device should fail to break the motor circuit to stop motor operation, the torsion bar 61 is rendered effective to bring the actuator to a cushioned stop. As the screw shaft 70 rotates counterclockwise as regards Figs. 4 and 5, the nut 90 moves downwardly. When the nut 90 reaches its lowermost position, the switch 111 is intended to break the motor circuit and stop motor operation; however, if, due to any cause, the switch or the electric circuit is not effectively broken to stop motor operation, then continued rotation of the screw shaft will cause its abutment member 85 to engage a corresponding abutment member 85a on the nut. The nut 90 being non-rotatable will act as a positive stop for continued rotation of the screw shaft in this direction. However, the turning effort of the motor on the torsion bar 60 will tend to deflect or twist said bar and being twisted it will provide an increased cushioning resistance to rotation of the motor, finally causing its stalling. It will be seen that the torsion bar 61 thus eliminates the sudden stopping of the motor and thus removes the possibility of serious damage.

If it is desired to vary the opening of switch 111 in accordance with the position of the nut relative thereto, screws 104 may be operated to release the ring 105, thereby permitting its rotative adjustment to offer more or less width of annular surface 106 as a contacting surface for the switch operating arm 114. As a wider surface 106 is presented, the switch will be operated earlier and as a narrower surface of portion 106 is presented, actuation of the switch lever 114 to open the switch 111 is retarded.

From the aforegoing it may be seen that applicant has provided an actuator capable of raising or lowering a load from one predetermined position into another, the actuator being of sturdy construction and having means whereby energization of the motor will automatically unlock the actuator and connect it with the motor for operation thereby, and on the other hand as soon as the motor is deenergized and rendered inoperative, connection between the motor and the rotatable member of the actuator is discontinued and said rotatable member is locked against any rotation in either direction.

While the embodiment of the present invention as herein disclosed, constitutes a preferred form, it is to be understood that other forms might be adopted, all coming within the scope of the claims which follow.

What is claimed is as follows:

1. An actuator comprising in combination, a reversible electric motor; a member to be rotated thereby; normally inoperative speed reducing gearing interposed between the electric motor and said member; said gearing comprising two separately rotating ring gears, the first ring gear being attached to the member to be rotated, the second ring gear being normally free to rotate and a third gear being operatively connected to the motor and to both of said ring gears; means normally urged to lock the first ring gear and thus said member against rotation, said means being operative to release said first ring gear and member and engage the second ring gear of the speed reducing gearing to render said gearing operative to transmit the rotation of the electric motor to said member; and an electromagnet connected to the locking means and operative, when energized, for actuating said locking means.

2. An actuator comprising in combination, a reversible electric motor; a member to be rotated thereby; normally inoperative speed reducing gearing interposed between the motor and said member, said gearing comprising two separate ring gears, one of which is attached to said member and an epicyclic gear driven by the electric motor and operatively engaging both ring gears; a latch normally, yieldably urged to engage and lock one of said ring gears against rotation and operative to disengage and release said one ring gear and engage and lock the other ring gear against rotation; an electromagnet for actuating the latch; and means operative to render the electromagnet active correlatively with the energization of the electric motor.

3. An actuator comprising in combination, a reversible electric motor; a member to be rotated thereby; normally inoperative speed reducing gearing interposed between the motor and said member, said gearing comprising two separate ring gears, one of which is attached to said member and an epicyclic gear driven by the electric motor and operatively engaging both ring gears; a latch normally, yieldably urged to engage and lock the ring gear attached to said member for preventing its rotation, said latch being operative to disengage and release said ring gear and to engage and lock the other ring gear against rotation for rendering the speed reducing gearing operative to transmit motion from the electric motor to said member; and electromagnetically actuated means connected to the latch and operative to move the latch out of the position into which it is yieldably urged.

4. An actuator comprising in combination, a reversible electric motor; a member to be rotated thereby; normally inoperative speed reducing gearing interposed between the motor and said member, said gearing comprising two separate ring gears, one of which is attached to said member and an epicyclic gear driven by the electric motor and operatively engaging both ring gears; a latch normally, yieldably urged to engage and lock the ring gear attached to said member for preventing its rotation, said latch being operative to disengage and release said ring gear and to engage and lock the other ring gear against rotation for rendering the speed reducing gearing operative to transmit motion from the electric motor to said member; a solenoid magnet; levers connecting the magnet with the latch; and means operative to effect energization of the solenoid magnet correlatively with the energization of the electric motor whereby the said member is released and the electric motor and speed reducing gearing rendered operative to rotate said member.

5. An actuator comprising in combination, a reversible electric motor; a shaft to be rotated thereby; normally inoperative speed reducing gearing comprising two ring gears and a cooperating epicyclic gear, the latter being driven by the motor; a shock absorbing torsion bar connecting one of said ring gears with the shaft; a latch normally urged into locking engagement with said one ring gear to prevent rotation of the shaft; and a magnetic shifter connected to the latch, said shifter, when energized, being operative to actuate the latch for releasing said one ring gear and lockingly engaging the other ring gear for rendering the speed reducing gearing operative.

6. An actuator comprising in combination, a reversible electric motor, a screw shaft to be rotated thereby; a non-rotatable nut threadedly mounted on said screw shaft and movable axially thereon in response to rotation thereof; normally inoperative speed reducing gearing comprising two ring gears and a cooperative epicyclic gear which is driven by the mtor; a torsion bar connecting one of the ring gears with the screw shaft; an abutment lug at each end of the nut; a cooperating abutment lug adjacent each end of the screw shaft; a latch normally urged into locking engagement with the ring gear secured to the torsion bar and operative to release said ring gear and engage and lock the other ring gear for rendering the speed reducing gearing operative; a magnetic shifter connected to the latch and operative to move the latch out of normal position; means operated by the nut when it reaches a predetermined position adjacent one or the other end of the screw shaft for rendering both the motor and the magnetic shifter inoperative, an abutment on the nut engaging a cooperating abutment member on the screw shaft to stop rotation of the screw shaft and cause twisting of the torsion bar after said last mentioned means has been operated by the nut.

7. An actuator comprising in combination, a reversible electric motor adapted to be connected to a source of electric power; a screw shaft having an abutment lug adjacent each end thereof; a non-rotatable nut threaded to said shaft and movable axially thereon in response to rotation thereof, said nut having an abutment lug on each end thereof, each respective lug being adapted to engage a lug on the screw shaft when the nut reaches a predetermined position on said shaft whereby further rotation of the screw shaft is prevented by the nut; normally inoperative speed reducing gearing comprising two ring gears and a cooperating epicyclic gear, the latter driven by the motor, one of the ring gears being attached to the screw shaft by a torsion bar; a detent normally urged against the ring gear attached to the screw shaft to prevent its rotation and operative to release said ring gear and engage and lock the other ring gear against rotation whereby the speed reducing gearing is rendered operative; and electromagnetic shifter connected to the detent for operating it out of normal position; and means controlled by the nut for rendering the electric motor and magnetic shifter inactive immediately before the nut moves one of its abutment lugs into engagement with a cooperating lug on the screw shaft.

8. An actuator comprising in combination, a reversible prime mover; a member to be operated by said prime mover; normally inoperative motion transmitting means interposed between the prime mover and said member, said means comprising three cooperating elements, one a rotatable element operatively attached to said member, the second element being normally free to rotate and the third element in constant operative engagement with the first and second elements and with the prime mover so as to be rotatable therewith; a single detent operative into locking engagement with either the first or the second of said elements to hold one or the other against rotation, said detent normally being in locking engagement with the first of said elements; yieldable means operative to urge the detent into normal position; and means rendered effective with the prime mover, said means being operative to actuate the detent into locking engagement with the second of said elements.

CALVIN J. WERNER.

REFERENCES CITED

The following references are of record in the file of this patent:

UNITED STATES PATENTS

| Number | Name | Date |
|---|---|---|
| 284,274 | Caldwell | Sept. 4, 1883 |
| 1,708,941 | Dean | Apr. 16, 1929 |
| 1,906,219 | Osgood | Apr. 25, 1933 |
| 2,053,055 | Wadd | Sept. 1, 1936 |
| 2,086,030 | Hodgson | July 6, 1937 |
| 2,246,673 | Glasner | June 24, 1941 |
| 2,259,437 | Dean | Oct. 21, 1941 |
| 2,383,901 | Werner | Aug. 28, 1945 |
| 2,387,713 | Bradford | Oct. 30, 1945 |